United States Patent [19]

Perryman, Jr.

[11] Patent Number: 5,531,158
[45] Date of Patent: Jul. 2, 1996

[54] PRODUCE RIPENING APPARATUS AND METHOD

[76] Inventor: Owen J. Perryman, Jr., P.O. Box 11137, Daytona Beach, Fla. 32120-1137

[21] Appl. No.: 243,330

[22] Filed: May 16, 1994

[51] Int. Cl.$^6$ ................................................. A23B 7/00
[52] U.S. Cl. .................... 99/467; 99/476; 99/474
[58] Field of Search .................. 99/467, 468, 472–476; 426/418, 419; 454/173, 228; 62/329

[56] References Cited

U.S. PATENT DOCUMENTS

| | | | |
|---|---|---|---|
| 1,817,875 | 8/1931 | Broadbent | 99/476 X |
| 2,278,571 | 4/1942 | Skinner | 426/263 |
| 4,676,152 | 6/1987 | Tsuji et al. | 99/468 |
| 4,779,524 | 10/1988 | Wade | 99/476 |
| 4,824,685 | 4/1989 | Bianco | 426/418 |
| 5,041,298 | 8/1991 | Wallace et al. | 426/418 |
| 5,163,360 | 11/1992 | Petz | 99/467 X |
| 5,203,256 | 4/1993 | Mueller | 99/476 X |
| 5,373,780 | 12/1994 | Bianco | 99/474 X |
| 5,438,917 | 8/1995 | Bolkestein et al. | 99/467 X |

*Primary Examiner*—Patrick Brinson
*Attorney, Agent, or Firm*—Edward M. Livingston

[57] ABSTRACT

A produce-ripening room (1) has a pallet rack (8) designed to support one or more modular pairs of two loaded pallets (11) juxtaposed side-by-side with a select space between them for central distribution of conditioned atmosphere under pressure throughout produce crates (12) positioned on the pallets (11). The modular pairs of two loaded pallets (11) can be one-to-three tiers high, up to twelve tiers deep and as many tiers wide as desired stacked bin boxes may be substituted for the pallets. A top horizontal baffle (22) is positioned vertically above and extended from end-to-end over depth of the select space between the modular pairs of two loaded pallets (11) and seals (26, 27, 36, 37) are positioned on four sides of the select space to provide a central high-pressure plenum (25, 34) for a first embodiment. For a second embodiment, the top horizontal baffle (22) is extended over the entire pallet rack and valves (50) can be positioned at sides to create a chamber high-pressure central plenum (47) throughout the space occupied by stacked produce crates (12) in addition to central high-pressure plenums. A third embodiment omits the central high-pressure plenums and employs central pressure supply throughout the chamber plenum for a form of low-temperature pressure-processing of all types of produce in all types of crates. A closed-circuit color-television camera or optical sensor (58) and instrumentation (59) can provide remote observation and control.

28 Claims, 8 Drawing Sheets

5,531,158

PRODUCE RIPENING APPARATUS AND METHOD

BACKGROUND OF THE INVENTION

This invention relates to ripening rooms in which agricultural produce is maintained in a controlled environment to precool, retard and/or regulate its ripening rate and uniformity in order to achieve an optimum condition for marketing.

In metropolitan areas, large quantities of agricultural produce is purchased in an unripe condition by wholesalers who distribute it to retail stores in a marketable state of ripeness for consumers. Most agricultural products consumed in industrialized countries have been and continue to be further developed for their ability to be stored in an unripe condition and to be ripened to a marketable state in a refrigerated supply line. Unripeness decreases damage and spoilage throughout a refrigerated chain of supply from farmers to retailers. Large refrigerated warehouses with many truckloads and sometimes trainloads of unripe produce are bought, ripened as needed for market and sold by wholesalers to take advantage of seasonal supplies and large-volume purchasing prices.

Bananas, however, are given a special ripening treatment in separate ripening rooms. The special treatment of bananas is more expensive per weight of produce but justifiable by particularly long supply seasons and high market volume. Due to relatively low retail price of bananas, minimizing cost of their separate ripening process is critical. The same ripening process could be used for lower-volume produce.

A previous ripening room for bananas is described in U.S. Pat. No. 5,041,298 granted to Wallace, et al. It employed fans at an interstitial wall at one end of a ripening room to draw refrigerated air through ventilation apertures in banana crates stacked from-end-to-end of the ripening room. From between the interstitial wall and the end of the ripening room, the air is recirculated up, over, down and back through the banana crates. Negative-pressure drawing of air through the ventilation apertures did not provide distribution of processing gases and refrigerated air as evenly and as thoroughly as positive-pressure circulation employed in this invention. A special interstitial wall and circulation area required extra floor space at high cost. Further, the Wallace device still required labor-intensive and costly use of mold-harboring tarp or blinds over ends of stacks.

Another tarp-using ripening room was described in U.S. Pat. No. 4,824,685 granted to Bianco, issued Apr. 25, 1989. Tarp or other film material was used continuously to seal off ends and tops of banana crates. Refrigerated air from sides was drawn to a negative-pressure plenum between rows of crates on pallets by suction fans at an end of the negative-pressure plenum. Then, like the Wallace device, the Bianco system also recirculated the refrigerated air from between an interstitial wall and an end of the ripening room. Most problems of the Wallace and the Bianco devices are similar, although the Wallace device provided a shorter distance for sucking air through the banana crates. The Bianco device also employed many motions and moving parts, thereby increasing costs and both initial and future maintenance requirements.

SUMMARY OF THE INVENTION

In light of problems that have existed and that continue to exist in this field, objectives of this invention are to provide a produce ripening room which:

Forces refrigerated air in and around produce in containers in a ripening room;

Provides refrigerated air as a medium for conveying produce-processing gases in and around produce in a ripening room;

Provides compartmental sealing of produce for compartmental and flexible processing in a ripening room;

Provides automatic sealing without use of a tarp or cover sheet for continued processing of portions of produce remaining in a ripening room after other portions of the produce have been removed;

Provides redundancy of pressurizers with one at each of a plurality of modules of central high-pressure plenums to assure continued operation of other modules in event of failure of one pressurizer;

Maximizes use of floor space by not requiring an interstitial suction area now employed in ends of ripening rooms;

Utilizes stacks of cases of bananas as walls for a high-pressure plenum to convey refrigerated air under pressure to ventilation apertures in banana cases for circulation in communication with the bananas;

Allows continued pressurization of remaining processing compartments when one or more pressurization units may fail or may be turned off for desired reasons;

Allows compartmental variation of processing pressures for different produce and for different produce conditions;

Provides modular design for different sizes of ripening, bulk storage and/or precooling rooms with stacks of 1-to-3 tiers, depths of up to 12 tiers and any practical plurality of widths of tiers;

Provides remote control and recording of temperature, humidity, time and gas conditions for separate processing compartments, for separate groups of compartments or for separate ripening rooms of compartments as desired;

Provides closed-circuit color-television and/or optical sensors to monitor ripening color;

Provides chamber high-pressure plenums for low-temperature pressure-processing of entire rooms of produce, regardless of differences in sizes, shapes and positioning of ventilation apertures of produce crates; and Provides modular high-pressure plenums optionally in addition to chamber high-pressure plenums for controlled ripening of produce in different sizes and shapes of crates.

This invention accomplishes the above and other objectives with a produce-ripening room having a pallet rack designed to support one or more modular pairs of two loaded pallets juxtaposed side-by-side with a select space between them. The modular pairs of two loaded pallets can be one-to-three tiers high, up to twelve tiers deep and as many tiers wide as desired. Thermal-insulated walls of the produce-ripening room are structured to house the modular pallets with provision for circulation of air between outside peripheries of the modular pairs of two loaded pallets and inside peripheries of a ceiling and walls of the room. A top horizontal baffle is positioned vertically above and extended from-end-to-end over the depth of the select space between the modular pairs of two loaded pallets. An upper vertical seal is extended vertically down from opposite sides of the top horizontal baffle to sealing contact with top-inside edges of a top tier of produce crates stacked on a top tier of pallets. A lower-tier vertical seal is extended from bottom-inside edges of a pallet-guide sealing rail on which the top tier of produce crates is stacked and positioned in sealing relationship to top-inside edges of a lower tier of produce crates. Vertical cell baffles are extended vertically between top-inside and bottom-inside edges of the stacks to complete a sealed compartment between all sides of the space between separate modular pairs of crates. A pressurization fan is positioned to pressurize conditioned air from a room conditioner to a separate high-pressure plenum within each sealed compartment. The pressurized and refrigerated air, with optional ripening gases and humidity included, is then directed through ventilation apertures in the crates where it contacts produce in the crates. The air escapes horizontally to low-pressure plenums at outside edges of the tiers and is recirculated. Remote controls are provided as desired. This embodiment is primarily for processing bananas.

Controlled ripening of other types of produce such as tomatoes, avocadoes, apples, peaches, grapes, citrus fruit, melons and stone fruits can also be profitable. Other produce, however, is packed in a wide variety of crates that do not conform to the sealing and ventilating features with the uniformity of banana crates. For this purpose, general ripening rooms for produce packed in different sizes and shapes of crates can be provided with a high-pressure plenum comprising entire rooms of pallet stacks instead of only an interstitial space between them.

This is accomplished by extending the top horizontal baffle to a position above outside edges of stacks. A controllable plenum valve, preferably a long butterfly type, is positioned between an inside periphery of the room and the extended top baffle plate. This causes refrigerated air and optional ripening gases to enter into any and all spaces around produce in all types of containers before escaping through the controllable plenum valve. In principle, it is like pressure cooking but at low pressure and low temperature.

A porous walkway, such as a grate, can be provided between stacks and the vertical-cell baffles can be pivotal-like doors for visual inspection of produce when this option is desired. For some medium and small wholesale operations, this inspection feature is particularly significant for storing and ripening assortments of different types of produce. Produce wholesalers can have some specialized banana ripening rooms and some general ripening rooms. Others with smaller operational volumes or more variable market and supply conditions can use the general ripening rooms for bananas and for other produce in separate ripening modules or compartments.

BRIEF DESCRIPTION OF THE DRAWINGS

This invention is described by appended claims in relation to description of a preferred embodiment with reference to the following drawings which are described briefly as follows:

DESCRIPTION OF PREFERRED EMBODIMENTS

Figure 1:
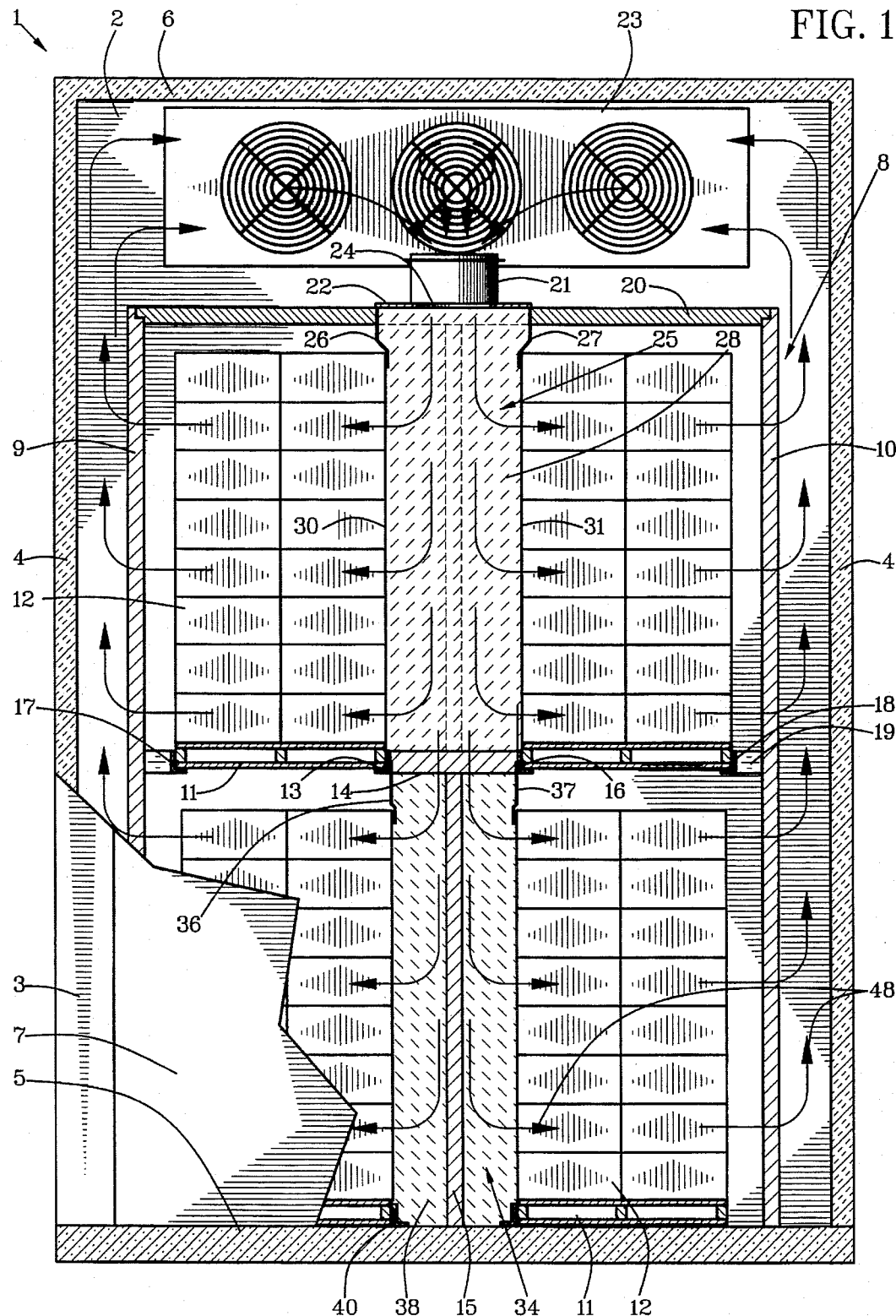
FIG. 1 is a cutaway front view of a ripening chamber with a two-tier rack showing airflow route for a central high-pressure plenum.

Reference is made first to FIG. 1. A ripening chamber 1 has a rear wall 2, a front wall 3, side walls 4, a floor 5, a ceiling 6 and a door 7. A pallet rack 8 has left-side rack pillars 9 spaced apart from right-side rack pillars 10 to receive two pallets 11 on which produce crates 12 are stacked. The pallets 11 for a first tier of produce crates 12 are juxtaposed resting on the floor 5. Insides of left-side pallets 11 for a second tier of produce crates 12 are positioned on a left-top pallet-sealing rail 13 that is attached to a left side of a second-tier central platform 14 that is supported by at least one central rack pillar 15. Outsides of right-side pallets 11 for the second tier of produce crates 12 are positioned on a right-top pallet-sealing rail 16 that is supported by the same central rack pillar 15. Outsides of the left-side pallets 11 for the second tier of produce crates 12 are positioned on a left-top rack rail 17 that is supported by left-side rack pillars 9. Outsides of the right-side pallets 11 for the second tier of produce crates 12 are positioned on a right-top rack rail 18 that is supported by right-side rack pillars 10.

The pallet-sealing rails 13 and 16 and the rack rails 17 and 18 can be similar to metal angle beams. They are referred to as rails because the pallets 11 are positional on them in a way that is referred to as riding on them. The rails 13 and 16 for the insides of the pallets 11 also function in a sealing capacity. Therefore, they are referred to as pallet-sealing rails 13 and 16. The rack rails 17 and 18 can be attached to the rack pillars 9 and 10 with rack appendages 19 that are extended from the rack pillars 9 and 10.

Extended across tops of the rack pillars 9 and 10 and from-end-to-end of the pallet rack 8 is horizontal rack structure 20. It is a design plurality of cross beams that provide a platform on which pressurizers 21 and top horizontal baffles 22 are positioned. The pressurizers 21 force air that has been cooled, mixed with ripening gas or otherwise conditioned as conditioned atmosphere by atmosphere conditioner 23. Top-baffle apertures 24 direct conditioned atmosphere pressurized by the pressurizers 21 into central circulation sections between the stacked produce crates 12. Only one pressurizer 21 is shown in this front view because others are assumed to be lined up behind it.

Figure 2:
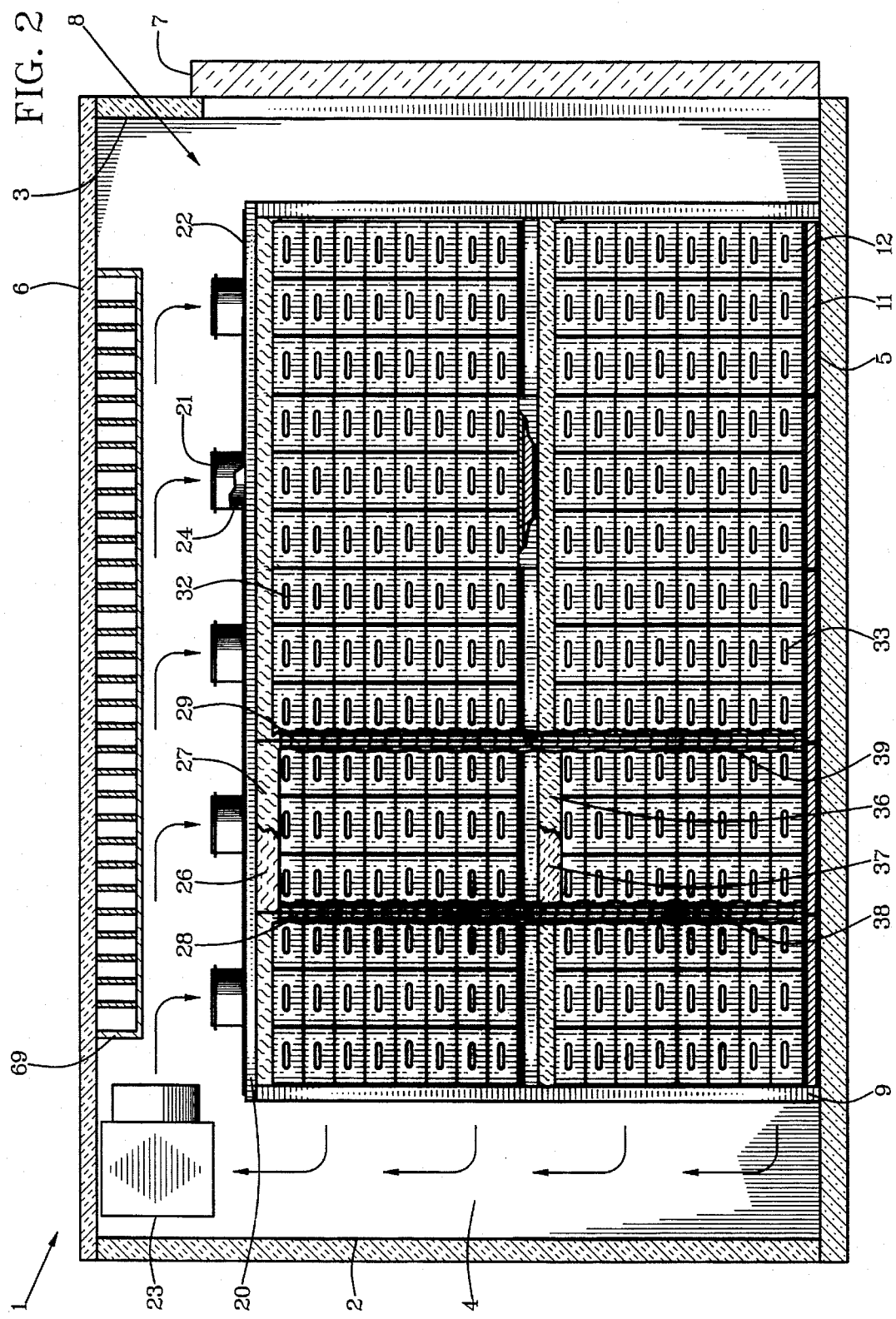
FIG. 2 is a cutaway side view of the FIG. 1 illustration also showing the airflow route.
Figure 3:
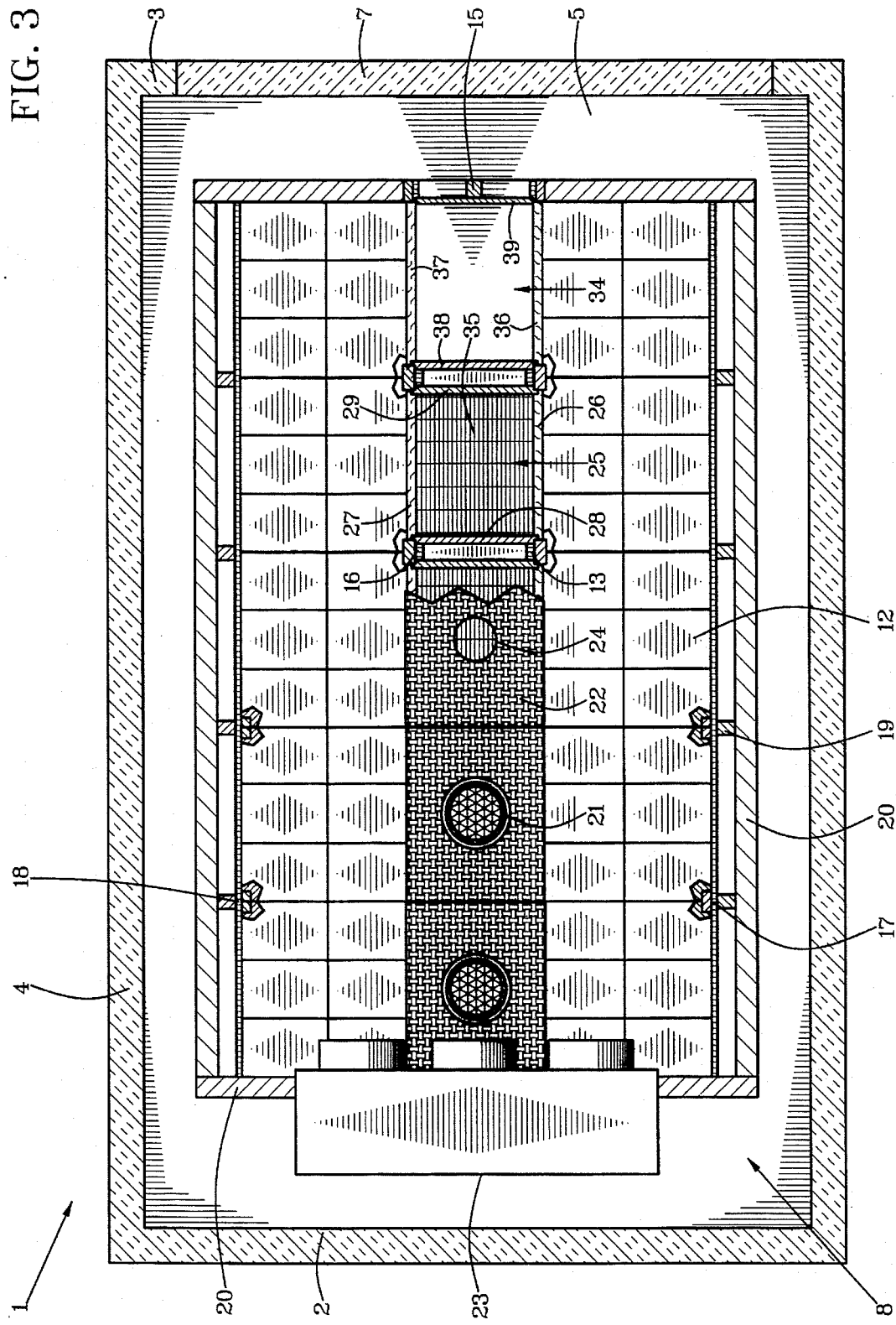
FIG. 3 is a cutaway top view of the FIG. 2 illustration.

Reference is made here to multiple FIGS. 1–3 in order primarily to describe the central circulation sections and flow of conditioned atmosphere. The central circulation sections are referred to as high-pressure plenums for particular tiers of produce crates 12 in an embodiment of this invention which creates a central high-pressure plenum instead of another embodiment which creates a high-pressure plenum for an entire rack 8 of produce crates 12.

In this embodiment, therefore, each of a plurality of top high-pressure plenums 25 is bounded by a top horizontal baffle 22, a left-top vertical seal 26, a right-top vertical seal 27, a top-inside vertical cell baffle 28, a top-outside vertical cell baffle 29, sides of left stacks of produce crates 30 and sides of right stacks of produce crates 31. Surrounding the top high-pressure plenums 25 in this manner directs flow of conditioned atmosphere into inside ventilation apertures 32 on insides of produce crates 12 in stacks on the pallets 11. Pressurizing the conditioned atmosphere and providing the inside ventilation apertures 32 as the only escape for the pressurized atmosphere will cause it to flow over produce in the produce crates 12 in what comprises a return conveyance as indicated by direct-flow arrows 48 of a complete cycle or circuit of the conditioned atmosphere.

The return conveyance is first horizontal through in-line ventilation apertures in produce crates 12 stacked on top pallets 11. After flowing through the produce crates 12 where it will contact produce in them, the conditioned atmosphere then flows out of the produce crates 12 through outside ventilation apertures 33. Most produce crates, particularly banana crates, have ventilation apertures in both ends or sides such that they can be stacked in either linear direction. An inside ventilation aperture 32 is whichever one is stacked facing inward. The outside ventilation aperture 33 is the opposite end.

Then air flow is horizontal to the rear of the room, vertical through the pressurizer 21 and both vertical and horizontal between outside edges of the pallets 11 and inside surfaces of the side walls 4 of the ripening chamber 1 en route back to the container 23. Before entering the pressurizer 21, however, the conditioned atmosphere will be reconditioned and or mixed with reconditioned atmosphere for recirculation through the pressurizer 21.

A bottom high-pressure plenum 34 is a continuation of the top high-pressure plenum 25. The bottom high-pressure plenum 34 is bounded vertically by the same top horizontal baffle 22 because there is either an open space or a grate 35 that can be a permeable walkway that do not impede vertical flow of conditioned atmosphere between them. On its left side, the bottom high-pressure plenum 34 is bounded by a left-bottom vertical seal 36 extending from the left-top pallet-sealing rail 13 to a top edge of the left-bottom stack of produce crates 12. On its right side, the bottom high-pressure plenum 34 is bounded by a right-bottom vertical seal 37 extending from the right-top pallet-sealing rail 16 to a top edge of the right-bottom stack of produce crates 12. On its inside, the bottom high-pressure plenum 34 is bounded by a bottom-inside vertical cell baffle 38 that extends from the top-inside vertical cell baffle 28 to a desired position proximate the floor 5. On its outside, the bottom high-pressure plenum 34 is bounded by a bottom-outside vertical cell baffle 39 that extends from the top-outside vertical cell baffle 29 to a desired position proximate the floor 5. On the floor 5 can be positioning rails 40 for positioning bottom pallets 11 properly in relation to the rack pillars 9 and 10. Also, as shown in FIG. 2, an optional baffled heat exchanger 69 can be utilized to cool the room during the process.

Alternatively, a unitary vertical cell baffle can be used between cells, such that there would be a plurality of top or bottom inside vertical-cell baffles and only one top and one bottom-outside vertical cell baffle. Such a unitary vertical cell baffle could be thicker as necessary to span any structural or positional distance between stacks from-front-to-back of the pallet rack 8. A unitary vertical cell baffle that pivots like a door is shown and described in relation to FIG. 8.

Figure 4:
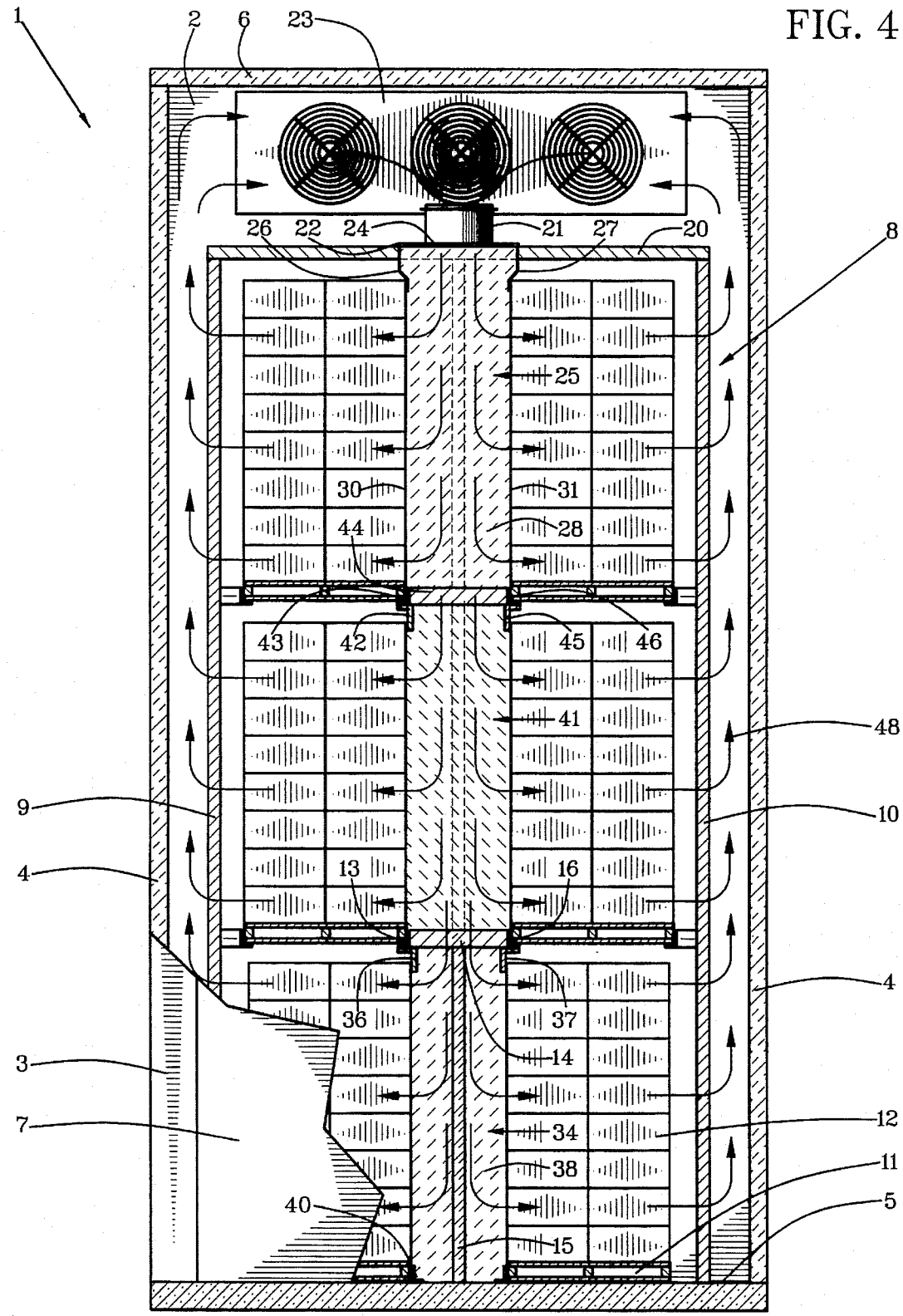
FIG. 4 is a cutaway front view of a ripening chamber with a three-tier rack showing airflow route for a central high-pressure plenum.

Reference is made here to FIG. 4 which illustrates a three-tier ripening chamber 1 and related pallet rack 8. The same description applies to the top high-pressure plenum 25 and the bottom high-pressure plenum 34 as for the two-tier ripening chamber 1 and related pallet rack 8 of FIGS. 1–3. A second high-pressure plenum 41 is positioned vertically between the top high-pressure plenum 25 and the bottom high-pressure plenum 34.

The second high-pressure plenum 41 is bounded on its left side by a left-second vertical seal 42 which extends from a left-second pallet-sealing rail 43 which is attached to a left side of a third-tier central platform 44. On its right side, the second high-pressure plenum 41 is bounded by a right-second vertical seal 45 which extends from a right-second pallet-sealing rail 46 which is attached to a right side of the third-tier central platform 44. As for all tiers, sides of left stacks of crates 30 and sides of right stacks of crates 31 form sides through which pressurized atmosphere is directed through the inside ventilation apertures 32 as described in relation to FIG. 2. Vertical baffles are not shown separately for this second tier because they are best illustrated in a top view as described in FIG. 8 or in FIGS. 1–3 and designated as top-inside vertical cell baffle 28 and top-outside vertical cell baffle 29.

Second and third tiers of produce crates 12 can be directly above the bottom tier as shown in FIG. 4 or slightly outward as shown in FIG. 1. Vertical seals can be constructed of flexible rubber-like material to allow them to fall in place and to be pressured outwardly against the stacks of produce crates 12.

Three-tier ripening chambers using conventional methods are common for high-volume wholesalers. Two-tier ripening chambers are used mostly by smaller wholesalers or by wholesalers who have relatively small volumes of produce for which they employ controlled ripening. This invention, not only makes controlled ripening of bananas more profitable. It also makes controlled ripening of nearly all other produce more profitable than mere cold storage using present methods.

Figure 5:
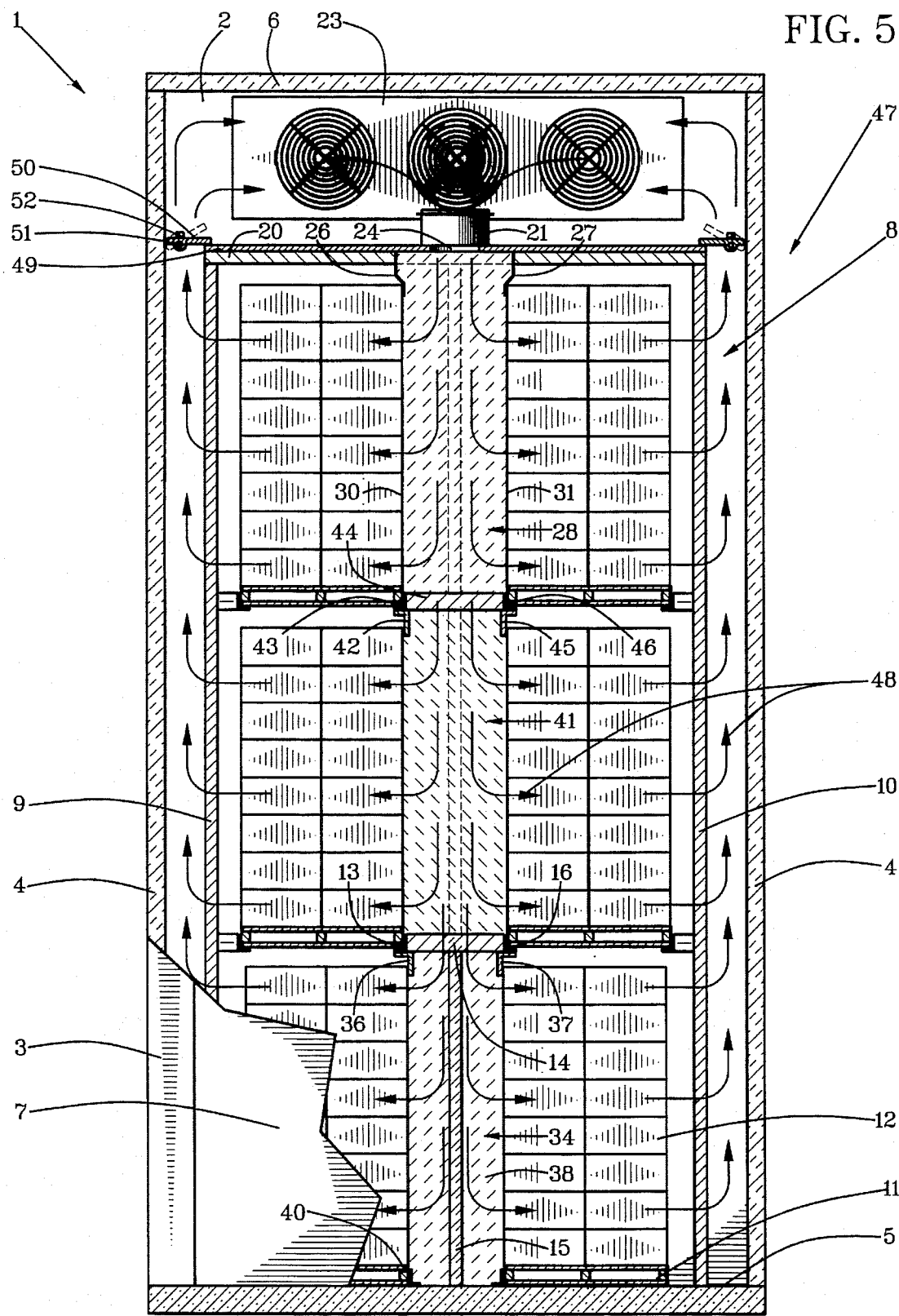
FIG. 5 is a cutaway front view of a ripening chamber with a three-tier rack showing airflow route for a central high-pressure plenum and a high-pressure plenum comprising the entire stack space.
Figure 6:
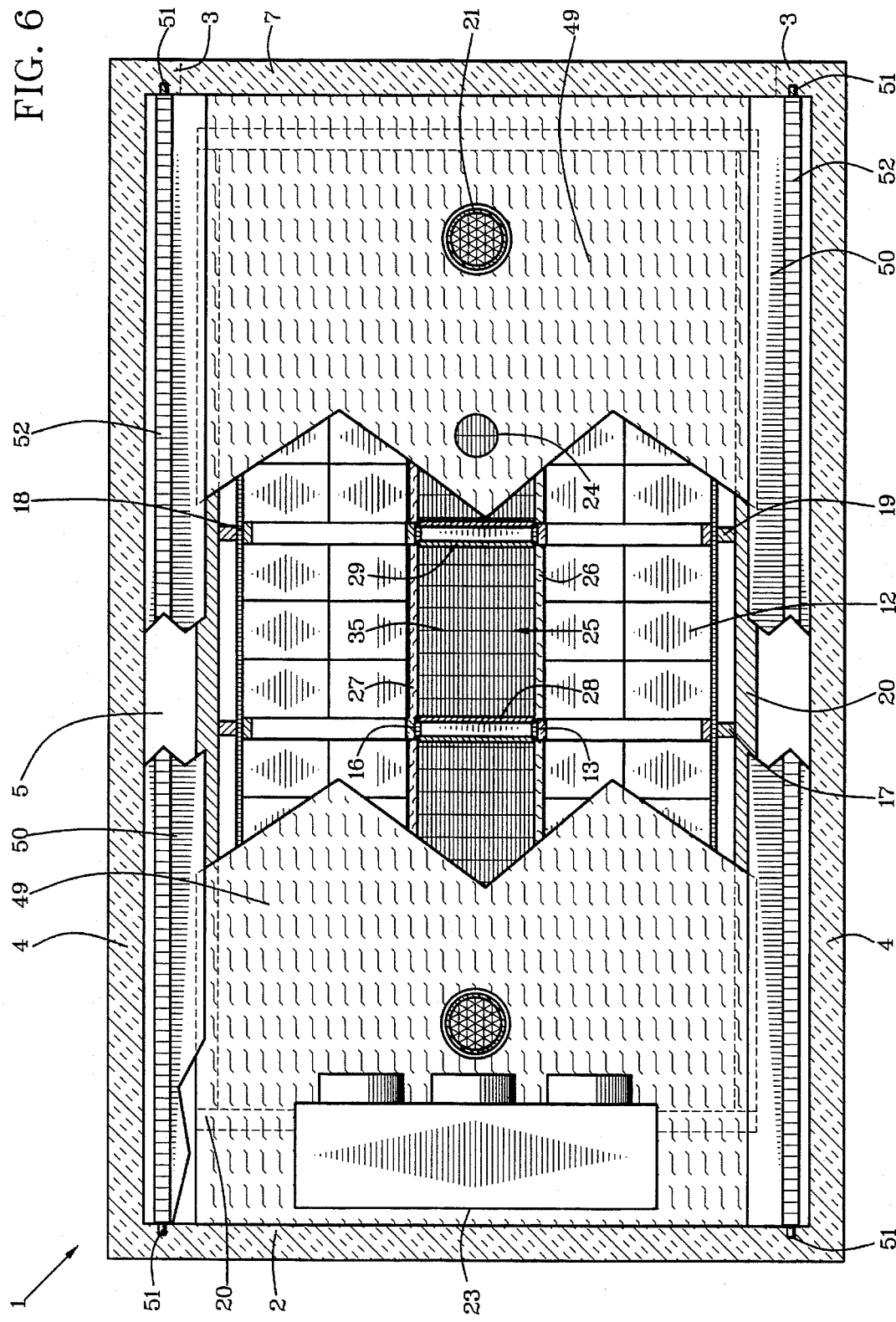
FIG. 6 is a cutaway top view of a ripening chamber having both a central high-pressure plenum and a high-pressure plenum comprising the entire stack space.

Reference is made here to FIGS. 5–6. Different from the embodiment illustrated in FIG. 4 and described additionally in relation to FIGS. 1–4, this embodiment has a chamber high-pressure plenum 47 comprising the entire portion of the ripening chamber 1 that is vertically below the horizontal rack structure 20. This chamber high-pressure plenum 47 is in addition to high-pressure plenums 25, 34 and 41 in central circulation sections between the stacks of produce crates 12. It can be used to create a higher pressure for greater penetration of conditioned atmosphere in produce crates 12 in the flow pattern indicated by direct-flow arrows 48. The conditioner 23 can be located at the front or rear of the room as well, preferably in the front of the room, which allows for economy of service and replacement.

For both ventilation and controlled air flow the chamber high-pressure plenum 47 is achieved by first modifying the top horizontal baffle 22 that covers only the top high-pressure plenum 25 described in FIGS. 1–4 with a chamber-plenum baffle 49 that extends from-side-to-side of the pallet rack 8 and from-end-to-end of the ripening chamber 1. Then a circulation seal means is positioned between the chamber-plenum baffle 49 and side walls 4 of the ripening chamber 1. The circulation seal means can be a rectangular butterfly valve 50 that pivots on an axle 51 that is attached rotationally to the front 3 and the rear wall 2 of the ripening room. The axle 51 can be made to protrude only from ends of the rectangular butterfly valve 50 as shown. The axle 51 can be off-centered as shown to direct opening pressure against one side. Additionally, a valve weight 52 can be positioned permanently or positional as desired on top of the rectangular butterfly valve 50 to provide a desired resistance to opening of the butterfly valve 50. Further in addition, the butterfly valve 50 can be weighted on either side of the axle 51 to provide a similar effect to the permanent or positional valve weight 52. A side of the butterfly valve 50 that is long and heavy in comparison to an opposite lighter and shorter side can rest on the chamber-plenum baffle 49 when gravity-closed due to absence of pressure or insufficient pressure in the chamber high-pressure plenum 47 to open it. The butterfly valve 50 is shown closed in solid lines and open in dashed lines.

Figure 7:
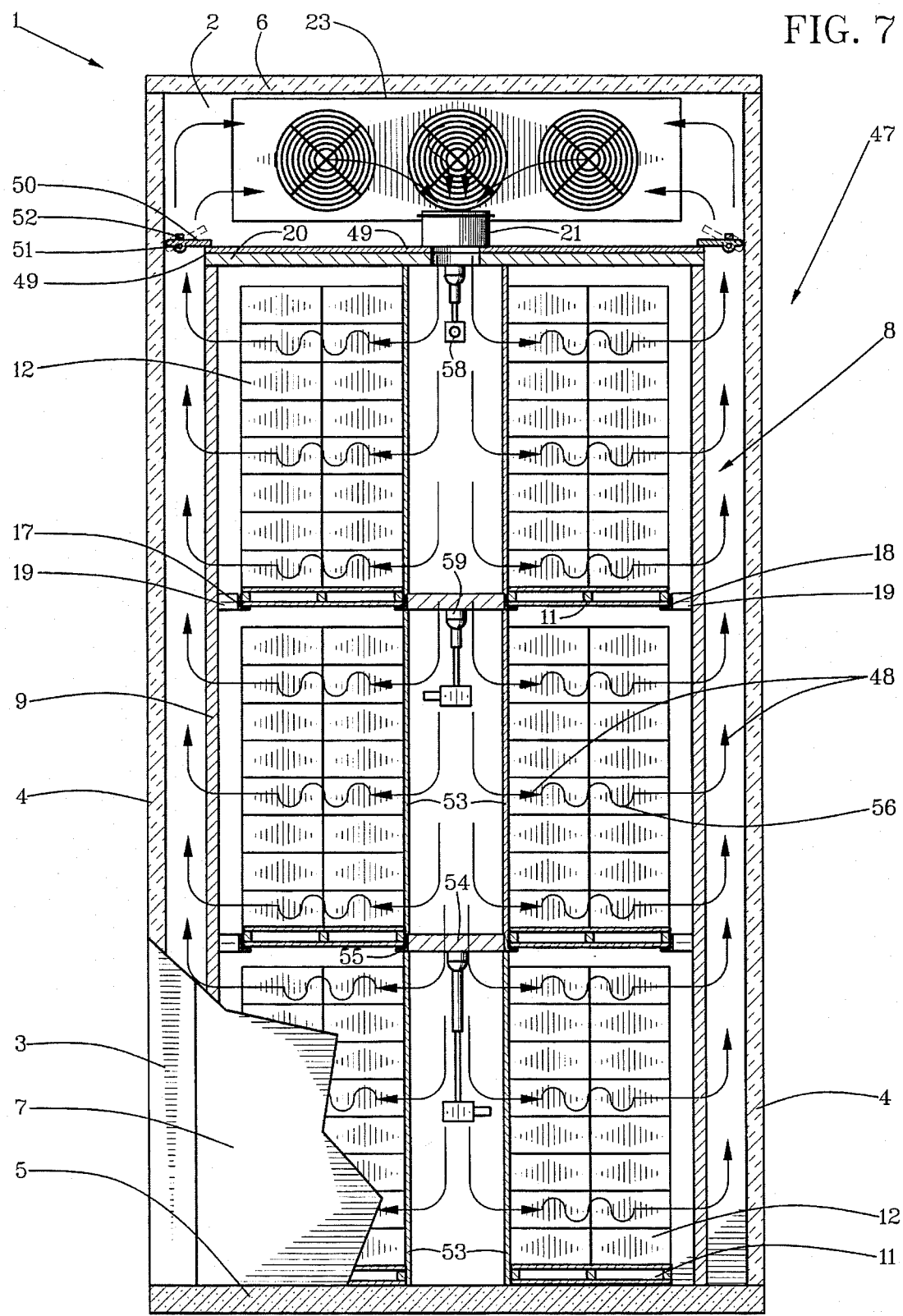
FIG. 7 is a cutaway top view showing airflow route and data-supply instruments, including closed-circuit color television, for a ripening chamber having a three-tier rack with a high-pressure plenum comprising the entire stack space.
Figure 8:
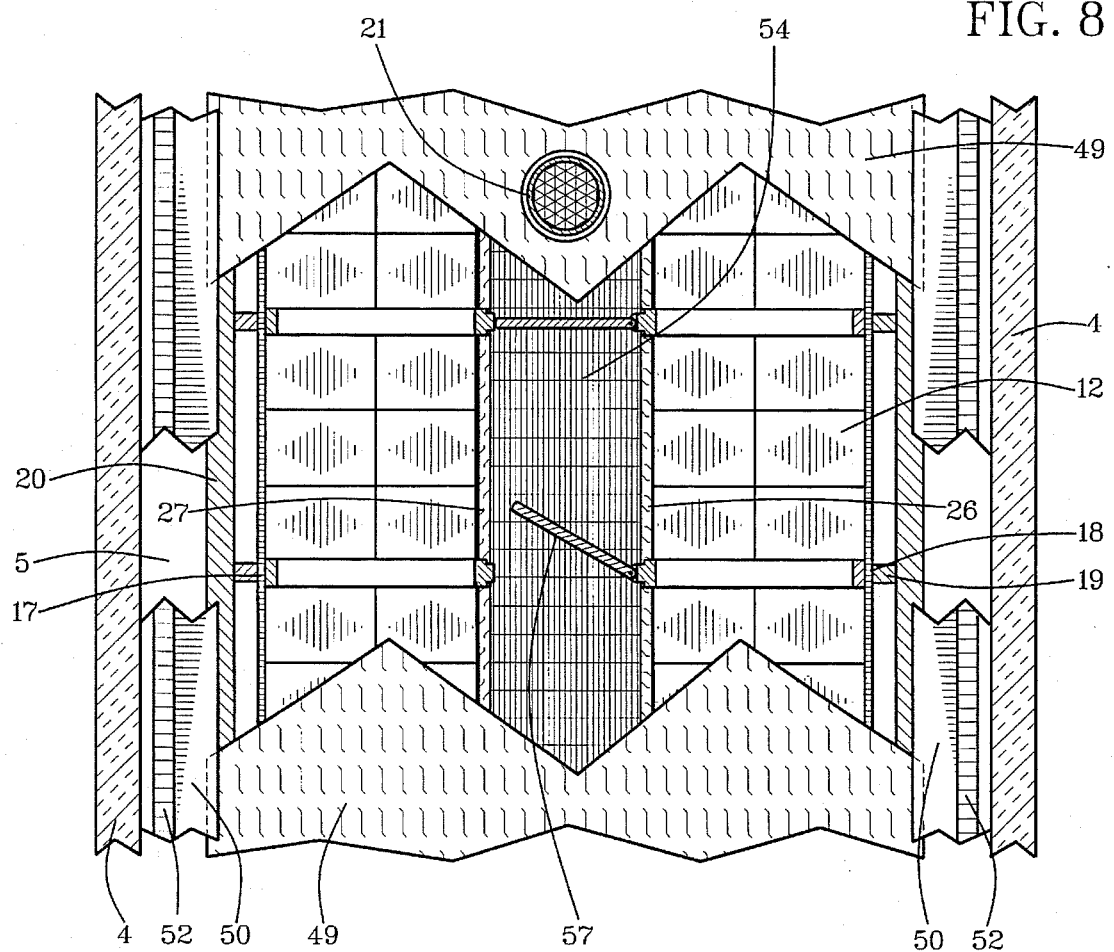
FIG. 8 is a sectional cutaway top view of a chamber high-pressure plenum combined with central high-pressure plenums and having hinged seals and a grate walkway for visual inspection of produce.
Figure 9:
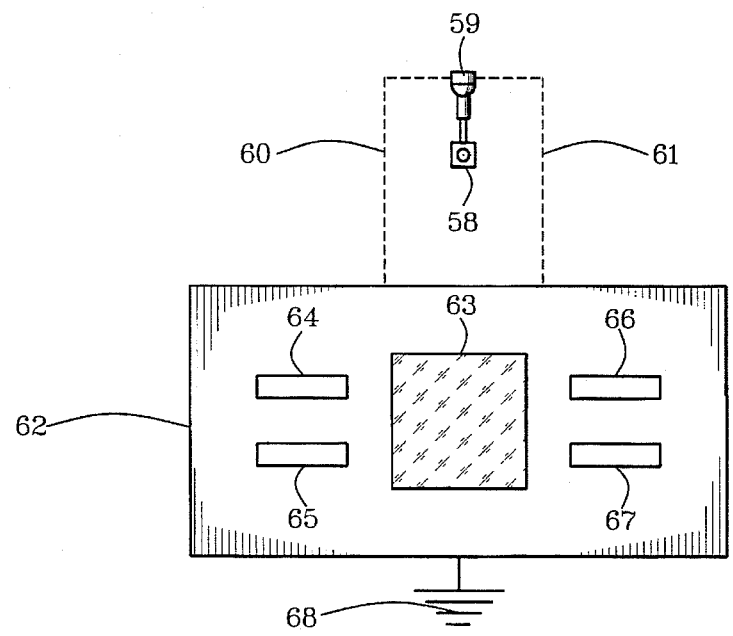
FIG. 9 is a layout diagram for remote control.

Reference is made here to FIGS. 7–9. The chamber high-pressure plenum 47 can be provided exclusively without the plenums 25, 34 and 41 for ripening a wide variety of produce in a wide variety of produce crates 12. The combined plenums described in relation to FIGS. 5 and 6 is primarily for either bananas or other produce or bananas in combination with other produce as may be desirable for some produce business conditions.

The chamber high-pressure plenum 47 exclusively is similar to that described in relation to FIGS. 5–6, except for omission of high-pressure plenums 25, 34 and 41 while keeping the same flow pattern. Other modifications can include tandem central pillars 53 and permeable walkways 54 positioned from-end-to-end of the pallet rack 8 on the tandem central pillars 53 for inspecting produce. The sealing rails 13, 16, 43 and 46 can be the same but need not have sealing characteristics and, therefore, can be designated as inside rails 55.

Central positioning of the pressurizers 21 for fluid flow of conditioned atmosphere through a central circulation section between two stacks of produce crates 12, return flow horizontally through produce crates 12 and then vertical flow upward to the pressurizer 21 and atmosphere conditioner 23 are common to all embodiments of this invention. They enhance efficiency, economy and effectiveness of operation.

The term "high pressure" is used to describe the pressure provided by pressurizer 21. However, this is a trade term that describes what would otherwise be considered low pressure. But, it is high enough to achieve effective flow over produce in the embodiments described in relation to FIGS. 1–4. In the embodiments described in relation to FIGS. 5–8, the pressure can be high enough to provide pressurized penetration of the conditioned atmosphere into the produce for achieving desired ripening effects.

The pressure can be high enough in the chamber high-pressure plenum 47 to achieve entry of the conditioned atmosphere in and around various containers and wrappers of produce independently of flow over the produce or through the produce crates 12. Similar to pressure cooking at high temperatures, pressure cooling at low temperatures causes entry of gas into crevices, corners, pours and corners not penetrable by straight flow of conditioned gases after escaping from "high-pressure" plenums. This penetrative flow 56 is indicated by undulating portions of direct-flow arrows 48.

A pivotal end seal 57 is shown in FIG. 8 for use with centrally positioned high-pressure plenums 25, 34 and 41 described in relation to FIGS. 4–5. The grate 35 can be constructed as a permeable walkway 54 for either embodiment.

As shown in FIG. 7, a closed-circuit television camera 58 and instrumentation 59 such as thermometers, pressure gages, gas sensors and humidity sensors, preferably at a base of the television camera 58, can be positioned in either embodiment of ripening chamber 1. Television communication 60 and instrumentation communication 61 can be transmitted to a control center 62 as shown diagrammatically in FIG. 9. The control center 62 can have a color television monitor 63, a temperature readout 64, a pressure readout 65, a humidity readout 66 and a gas-constituency readout 67. All can be powered by an electrical source 68 and all can be computer analyzed and computer printed. The television camera 58 can be on a robotic arm that is telescopic and swivels to position the camera where desired over a wide area between stacked produce crates.

This invention provides efficient and effective ripening and warehousing of produce of all kinds and for all sizes and types of wholesale produce businesses. Its efficiency and its versatility are a major improvement of technology for the produce industry.

A new and useful produce-ripening apparatus and method having been described, all such modifications, adaptations, substitutions of equivalents, combinations of parts, applications and forms thereof as described by the following claims are included in this invention.

Having thus described my invention, I claim:

1. A produce-ripening apparatus comprising:

a ripening chamber with front, rear and side walls, a floor and a ceiling;

the ripening chamber having design dimensions for containment of a pallet rack of a desired size and for providing design circulation of controlled atmosphere exterior to the pallet rack;

a door in a desired wall of the ripening chamber;

design airtightness of the ripening chamber with the door closed;

design thermal insulation of the walls, ceiling and floor of the ripening chamber;

an atmosphere conditioner in atmosphere-conditioning relationship to space inside of the ripening chamber;

at least two rack pillars of the pallet rack spaced apart a distance to receive two pallets juxtaposed on opposite sides of a central circulation section and to allow design side clearance intermediate outside lateral edges of the two pallets and inside lateral edges of the rack pillars;

the pallet rack being extended in length to receive a design plurality of juxtaposed pallets end-to-end;

the rack pillars being extended a vertical distance to receive at least one tier of produce crates stacked on the two pallets;

horizontal rack structure extended intermediate the rack pillars at a position vertically above the produce crates;

at least one top horizontal baffle positioned centrally on the horizontal rack structure;

at least one pressurizer positioned centrally on the top horizontal baffle and having fluid communication with conditioned atmosphere provided by the atmosphere conditioner;

at least one pressurization conveyance in fluid communication intermediate the pressurizer and the central circulation section; and circulation seal means in sealing relationship between the top horizontal baffle and a high-pressure plenum in a return conveyance to the pressurizer respectively for each of the design plurality of juxtaposed pallets from-end-to-end of the pallet rack.

2. A produce-ripening apparatus as described in claim 1 wherein:

the high-pressure plenum is the central circulation section between two stacks of produce crates on two pallets juxtaposed between the rack pillars; and the high-pressure plenum is sealed by plenum seals at sides and edges of the high-pressure plenum.

3. A produce-ripening apparatus as described in claim 2 wherein the rack pillars are extended a vertical distance to receive one tier of produce crates stacked on the two pallets and the plenum seals include:

a left-top vertical seal in sealing relationship between a left side of the top horizontal baffle and a right-top side of a left-side stack of the crates;

a right-top vertical seal in sealing relationship between a right side of the top horizontal baffle and a left-top side of a right-side stack of the crates;

a top-inside vertical cell baffle in sealing relationship between an inside end of the top horizontal baffle and inside walls of pallet-sealing rails with which the pallets are positioned on the floor of the ripening chamber;

a top-outside vertical cell baffle in sealing relationship between an outside end of the top horizontal baffle and inside walls of pallet-sealing rails with which the pallets are positioned on the floor of the ripening chamber; and sides of produce crates on opposite sides of the high-pressure plenum, such that conditioned atmosphere in the high-pressure plenum is directed to a return conveyance that is first horizontal through in-line ventilation apertures in crates stacked on the pallets and then vertical intermediate outside lateral edges of the two pallets and inside surfaces of side walls of the ripening chamber en route back to the pressurizer respectively for each of the design plurality of juxtaposed pallets from-end-to-end of the pallet rack.

4. A produce-ripening apparatus as described in claim 2 wherein the rack pillars are extended a vertical distance to receive two tiers of produce crates stacked on two pallets for each tier and further comprising:

a left-top vertical seal in sealing relationship between a left side of the top horizontal baffle and a right-top side of a top-left-side stack of the crates;

a right-top vertical seal in sealing relationship between a right side of the top horizontal baffle and a left-top side of a top-right-side stack of the crates;

a top-inside vertical cell baffle in sealing relationship between an inside end of the top horizontal baffle and inside ends of top pallet-sealing rails with which the pallets are supported on the rack pillars;

a top-outside vertical cell baffle in sealing relationship between an outside end of the top horizontal baffle and outside ends of top pallet-sealing rails with which the pallets are supported on the rack pillars;

sides of produce crates positioned on opposite sides of a top high-pressure plenum, such that conditioned atmosphere in the top high-pressure plenum is directed to a return conveyance that is first horizontal through in-line ventilation apertures in crates stacked on top pallets and then vertical intermediate outside lateral edges of two top pallets and inside surfaces of side walls of the ripening chamber en route back to the pressurizer respectively for each of the design plurality of juxtaposed pallets from-end-to-end of the pallet rack;

at least one central rack pillar extended from the floor of the ripening chamber to a second-tier central platform;

a left-top pallet-sealing rail attached to a left side of the second-tier platform at a bottom-left side of the top high-pressure plenum;

a right-top pallet-sealing rail attached to a right side of the second-tier platform at a bottom-right side of the top high-pressure plenum;

a left-bottom vertical seal in sealing relationship between a left side of the left-top pallet-sealing rail and a right-top side of a bottom-left-side stack of the crates;

a right-bottom vertical seal in sealing relationship between a right side of the right-top pallet-sealing rail and a left-top side of a bottom-right-side stack of the crates;

a bottom-inside vertical cell baffle in sealing relationship between a left side of the left-top pallet-sealing rail, a right side of the right-top pallet-sealing rail, and inside walls of and inside end of pallet-sealing rails with which the pallets are positioned on the floor of the ripening chamber;

a bottom-outside vertical cell baffle in sealing relationship between a left side of the left-top pallet-sealing rail, a right side of the right-top pallet-sealing rail, and inside walls of an outside end of pallet-sealing rails with which the pallets are positioned on the floor of the ripening chamber; and sides of produce crates positioned on opposite sides of a bottom high-pressure plenum, such that conditioned atmosphere in the bottom high-pressure plenum is directed to a return conveyance that is first horizontal through in-line ventilation apertures in crates stacked on bottom pallets and then vertical intermediate outside lateral edges of two bottom pallets and inside surfaces of side walls of the ripening chamber en route back to the pressurizer respectively for each of the design plurality of juxtaposed pallets from-end-to-end of the pallet rack.

5. A produce-ripening apparatus as described in claim 4 and further comprising:

at least one central rack pillar extended from the second-tier central platform to the horizontal rack structure extended intermediate the rack pillars.

6. A produce-ripening apparatus as described in claim 2 wherein the rack pillars are extended a vertical distance to receive three tiers of produce crates stacked on two pallets for each tier and further comprising:

at least one central rack pillar extended from the floor of the ripening chamber to a second-tier central platform;

at least one central rack pillar extended from the second-tier central platform to a third-tier central platform;

a left-top vertical seal in sealing relationship between a left side of the top horizontal baffle and a right-top side of a top-left-side stack of the crates;

a right-top vertical seal in sealing relationship between a right side of the top horizontal baffle and a left-top side of a top-right-side stack of the crates;

a top-inside vertical cell baffle in sealing relationship between an inside end of the top horizontal baffle and inside ends of top pallet-sealing rails with which the pallets are supported on the rack pillars;

a top-outside vertical cell baffle in sealing relationship between an outside end of the top horizontal baffle and outside ends of top pallet-sealing rails with which the pallets are supported on the rack pillars;

sides of produce crates positioned on opposite sides of a top high-pressure plenum, such that conditioned atmosphere in the top high-pressure plenum is directed to a return conveyance that is first horizontal through in-line ventilation apertures in crates stacked on top pallets and then vertical intermediate outside lateral edges of two top-tier pallets and inside surfaces of side walls of the ripening chamber en route back to the pressurizer respectively for each of the design plurality of juxtaposed pallets from-end-to-end of the pallet rack;

a left-second pallet-sealing rail attached to a left side of the third-tier central platform at a bottom-left side of the top high-pressure plenum;

a right-second pallet-sealing rail attached to a right side of the third-tier central platform at a bottom-right side of the top high-pressure plenum;

a left-second vertical seal in sealing relationship between a right side of the left-second pallet-sealing rail and a right-top side of a second left-side stack of the crates;

a right-second vertical seal in sealing relationship between a left side of the right-second pallet-sealing rail and a left-top side of a second right-side stack of the crates;

a second inside vertical cell baffle in sealing relationship between a left side of the left-second pallet-sealing rail, a right side of the right-second pallet-sealing rail, and inside walls of an inside end of pallet-sealing rails with which pallets are supported on the second central platform;

a second-outside vertical cell baffle in sealing relationship between a left side of the left-top pallet-sealing rail, a right side of the right-second pallet-sealing rail, and inside walls of an outside end of pallet-sealing rails with which pallets are supported on the second-tier central platform;

sides of produce crates positioned on opposite sides of a second high-pressure plenum, such that conditioned atmosphere in the second high-pressure plenum is directed to a return conveyance that is first horizontal through in-line ventilation apertures in crates stacked on second-tier pallets and then vertical intermediate outside lateral edges of two second-tier pallets and inside surfaces of side walls of the ripening chamber en route back to the pressurizer respectively for each of the design plurality of juxtaposed pallets from-end-to-end of the pallet rack;

a left-bottom pallet-sealing rail attached to a left side of the second-tier platform at a bottom-left side of the second high-pressure plenum;

a right-bottom pallet-sealing rail attached to a right side of the second-tier platform at a bottom-right side of the second high-pressure plenum;

a left-bottom vertical seal in sealing relationship between a left side of the left-bottom pallet-sealing rail and a right-bottom side of a bottom-left-side stack of the crates;

a right-bottom vertical seal in sealing relationship between a right side of the right-bottom pallet-sealing rail and a left-bottom side of a bottom-right-side stack of the crates;

a bottom-inside vertical cell baffle in sealing relationship between a left side of the left-bottom pallet-sealing rail, a right side of the right-bottom pallet-sealing rail, and inside walls of and inside end of pallet-sealing rails with which bottom pallets are positioned on the floor of the ripening chamber;

a bottom-outside vertical cell baffle in sealing relationship between a left side of the left-bottom pallet-sealing rail, a right side of the right-bottom pallet-sealing rail, and inside walls of an outside end of pallet-sealing rails with which the bottom pallets are positioned on the floor of the ripening chamber; and sides of produce crates positioned on opposite sides of a bottom high-pressure plenum, such that conditioned atmosphere in the bottom high-pressure plenum is directed to a return conveyance that is first horizontal through in-line ventilation apertures in crates stacked on bottom-tier pallets and then vertical intermediate outside lateral edges of the bottom-tier pallets and inside surfaces of side walls of the ripening chamber en route back to the pressurizer respectively for each of the design plurality of juxtaposed pallets from-end-to-end of the pallet rack.

7. A produce-ripening apparatus as described in claim 4 and further comprising:

a permeable walkway positioned on the top of central rack pillars and extended from-end-to-end of the pallet rack;

pivot means on the top-inside vertical cell baffle and on the top-outside vertical cell baffle, such that the permeable walkway provides an inspection platform for visual inspection of produce in the crates on opposite sides of the top high-pressure plenum; and pivot means on the bottom-inside vertical cell baffle and on the bottom-outside vertical cell baffle, such that the permeable walkway provides an inspection platform that is accessible through pivotal vertical-cell baffles for visual inspection of produce in the crates on opposite sides of the bottom high-pressure plenum.

8. A produce-ripening apparatus as described in claim 6 and further comprising:

a permeable walkway positioned on the top of top central rack pillars and extended from-end-to-end of the pallet rack;

pivot means on the top-inside vertical cell baffle and on the top-outside vertical cell baffle, such that the permeable walkway provides an inspection platform that is accessible through pivotal vertical-cell baffles for visual inspection of produce in the crates on opposite sides of the top high-pressure plenum;

a permeable walkway positioned on the top of second central rack pillars and extended from-end-to-end of the pallet rack;

pivot means on the second-inside vertical cell baffle and on the second-outside vertical cell baffle, such that the permeable walkway provides an inspection platform that is accessible through pivotal vertical-cell baffles for visual inspection of produce in the crates on opposite sides of the top high-pressure plenum; and pivot means on the bottom-inside vertical cell baffle and on the bottom-outside vertical cell baffle, such that the permeable walkway provides an inspection platform that is accessible through pivotal vertical-cell baffles for visual inspection of produce in the crates on opposite sides of the bottom high-pressure plenum.

9. A produce-ripening apparatus as described in claim 1 wherein:

the high-pressure plenum is a chamber high-pressure plenum comprising a portion of the ripening chamber vertically below the horizontal rack structure and extending from-side-to-side and from-end-to-end of the ripening chamber;

the top horizontal baffle is extended from-side-to-side and from-end-to-end of a top of the rack structure; and the circulation seal means in sealing relationship between the top horizontal baffle and the high-pressure plenum in return conveyance to the pressurizer is a flow-control means positioned intermediate outside edges of the top horizontal baffle and inside peripheries of walls of the ripening chamber.

10. A produce-ripening apparatus as described in claim 9 wherein:
   the flow-control means is a rectangular butterfly valve having an axle that is offset such that pressure of fluid flow in return conveyance to the pressurizer can open the butterfly valve; and
   a weight positional variably on the butterfly valve to provide relative weight of a long side of the butterfly valve for gravity-closing the butterfly valve with desired closing pressure.

11. A produce-ripening apparatus as described in claim 7 and further comprising:
   a chamber high-pressure plenum which is a portion of the ripening chamber vertically below the horizontal rack structure and extending from-side-to-side and from-end-to-end of the ripening chamber;
   the top horizontal baffle is extended from-side-to-side and from-end-to-end of a top of the rack structure; and
   the circulation seal means in sealing relationship between the top horizontal baffle and the chamber high-pressure plenum in return conveyance to the pressurizer is a flow-control means positioned intermediate outside edges of the top horizontal baffle and inside peripheries of walls of the ripening chamber.

12. A produce-ripening apparatus as described in claim 11 wherein:
   the flow-control means is a rectangular butterfly valve having an axle that is offset such that pressure of fluid flow in return conveyance to the pressurizer can open the butterfly valve; and
   a weight positional variably on the butterfly valve to provide relative weight of a long side of the butterfly valve for gravity-closing the butterfly valve with desired closing pressure.

13. A produce-ripening apparatus as described in claim 8 and further comprising:
   a chamber high-pressure plenum which is a portion of the ripening chamber vertically below the horizontal rack structure and extending from-side-to-side and from-end-to-end of the ripening chamber;
   the top horizontal baffle is extended from-side-to-side and from-end-to-end of a top of the rack structure; and
   the circulation seal means in sealing relationship between the top horizontal baffle and the chamber high-pressure plenum in return conveyance to the pressurizer is a flow-control means positioned intermediate outside edges of the top horizontal baffle and inside peripheries of walls of the ripening chamber.

14. A produce-ripening apparatus as described in claim 13 wherein:
   the flow-control means is a rectangular butterfly valve having an axle that is offset such that pressure of fluid flow in return conveyance to the pressurizer can open the butterfly valve; and
   a weight positional variably on the butterfly valve to provide relative weight of a long side of the butterfly valve for gravity-closing the butterfly valve with desired closing pressure.

15. A produce-ripening apparatus as described in claim 1 wherein the rack pillars are extended a vertical distance to receive two tiers of produce crates stacked on two pallets for each pier and further comprising:
   at least one central rack pillar extended from the floor of the ripening chamber to a second-tier central platform;
   a permeable walkway positioned on a top of central rack pillars and extended from-end-to-end of the pallet rack;
   a chamber high-pressure plenum which is a portion of the ripening chamber vertically below the horizontal rack structure and extending from-side-to-side and from-end-to-end of the ripening chamber;
   the top horizontal baffle is extended from-side-to-side and from-end-to-end of the top of the rack structure; and
   the circulation seal means in sealing relationship between the top horizontal baffle and the chamber high-pressure plenum in return conveyance to the pressurizer is a flow-control means positioned intermediate outside edges of the top horizontal baffle and inside peripheries of walls of the ripening chamber.

16. A produce-ripening apparatus as described in claim 15 wherein:
   the flow-control means is a rectangular butterfly valve having an axle that is offset such that pressure of fluid flow in return conveyance to the pressurizer can open the butterfly valve; and
   a weight positional variably on the butterfly valve to provide relative weight of a long side of the butterfly valve for gravity-closing the butterfly valve with desired closing pressure.

17. A produce-ripening apparatus as described in claim 1 wherein the rack pillars are extended a vertical distance to receive three tiers of produce crates stacked on two pallets for each tier and further comprising:
   at least one central rack pillar extended from the floor of the ripening chamber to a second-tier central platform;
   at least one central rack pillar extended from the second-tier central platform to a third-tier central platform;
   permeable walkways positioned on tops of the second-tier central platform and the third-tier central platform and extended from-end-to-end of the pallet rack;
   a chamber high-pressure plenum which is a portion of the ripening chamber vertically below the horizontal rack structure and extending from-side-to-side and from-end-to-end of the ripening chamber;
   the top horizontal baffle is extended from-side-to-side and from-end-to-end of the top of the rack structure; and
   the circulation seal means in sealing relationship between the top horizontal baffle and the chamber high-pressure plenum in return conveyance to the pressurizer is a flow-control means positioned intermediate outside edges of the top horizontal baffle and inside peripheries of walls of the ripening chamber.

18. A produce-ripening apparatus as described in claim 17 wherein:
   the flow-control means is a rectangular butterfly valve having an axle that is offset such that pressure of fluid flow in return conveyance to the pressurizer can open the butterfly valve; and
   a weight positional variably on the butterfly valve to provide relative weight of a long side of the butterfly valve for gravity-closing the butterfly valve with desired closing pressure.

19. A produce-ripening apparatus as described in claim 1 and further comprising:
   a remote control means in communication of data to a control center from desired instrumentation such as thermometers, pressure gages, gas sensors and humidity sensors in the high-pressure plenum for inspection and recording.

20. A produce-ripening apparatus as described in claim 19 and further comprising:

a closed-circuit color television system in which a television camera is in communication of color of produce in the ripening chamber to the control center.

21. A produce-ripening apparatus as described in claim 4 and further comprising:

a remote control means in communication of data to a control center from desired instrumentation such as thermometers, pressure gages, gas sensors and humidity sensors in the high-pressure plenum for inspection and recording.

22. A produce-ripening apparatus as described in claim 21 and further comprising:

a closed-circuit color television system in which a television camera is in communication of color of produce in the ripening chamber to the control center.

23. A produce-ripening apparatus as described in claim 6 and further comprising:

a remote control means in communication of data to a control center from desired instrumentation such as thermometers, pressure gages, gas sensors and humidity sensors in the high-pressure plenum for inspection and recording.

24. A produce-ripening apparatus as described in claim 23 and further comprising:

a closed-circuit color television system in which a television camera is in communication of color of produce in the ripening chamber to the control center.

25. A produce-ripening apparatus as described in claim 15 and further comprising:

a remote control means in communication of data to a control center from desired instrumentation such as thermometers, pressure gages, gas sensors and humidity sensors in the high-pressure plenum for inspection and recording.

26. A produce-ripening apparatus as described in claim 25 and further comprising:

a closed-circuit color television system in which a television camera is in communication of color of produce in the ripening chamber to the control center.

27. A produce-ripening apparatus as described in claim 17 and further comprising:

a remote control means in communication of data to a control center from desired instrumentation such as thermometers, pressure gages, gas sensors and humidity sensors in the high-pressure plenum for inspection and recording.

28. A produce-ripening apparatus as described in claim 27 and further comprising:

a closed-circuit color television system in which a television camera is in communication of color of produce in the ripening chamber to the control center.

* * * * *